United States Patent [19]

Dudley

[11] Patent Number: 4,947,961
[45] Date of Patent: Aug. 14, 1990

[54] STEP FOR ATTACHMENT TO A WHEEL OR BUMPER

[76] Inventor: Frank Dudley, 581 S. Eighth St., Eklo, Nev. 89801

[21] Appl. No.: 443,128

[22] Filed: Nov. 28, 1989

[51] Int. Cl.⁵ ............................ B60R 3/00; E06C 5/24
[52] U.S. Cl. ...................................... 182/92; 182/150; 182/206; 280/165
[58] Field of Search ...................... 182/150, 93, 92, 91, 182/90, 206; 280/165

[56] References Cited

U.S. PATENT DOCUMENTS

| | | | |
|---|---|---|---|
| 957,324 | 5/1910 | Gall | 182/150 |
| 2,378,678 | 6/1945 | Anderson | 182/150 |
| 2,679,436 | 5/1954 | Viebrock | 182/150 |
| 2,848,150 | 8/1958 | Tans | 182/150 |
| 2,973,052 | 2/1961 | Miller | 182/150 |
| 3,011,587 | 12/1961 | Mallog | 182/150 |
| 3,078,952 | 2/1963 | Kelling | 182/150 |
| 3,865,431 | 2/1975 | Zakhi | 297/217 |
| 4,495,883 | 1/1985 | Hoy | 182/150 |
| 4,605,098 | 8/1986 | Leuty | 182/92 |
| 4,782,916 | 11/1988 | Hays | 182/150 |
| 4,800,987 | 1/1989 | Liles | 182/92 |

*Primary Examiner*—Reinaldo P. Machado

[57] ABSTRACT

A portable step apparatus for removable connection to the wheel or bumper of a vehicle to provide a stable platform for a person while working in the engine compartment thereof. The step apparatus comprises a support frame assembly which is securely attached to the exterior surface of the wheel or bumper by an attaching apparatus. A step assembly is adjustably attached to the frame assembly so that the user can adjust the step the desired height. Stabilizing straps may be attached to the bottom of the frame assembly and wrapped around the tire, or passed below the bumper and securely attached to the vehicle to prevent the bottom of the frame assembly from moving sideways or from being pushed away from the vehicle due to the forces generated on the step caused by a person moving around thereon or leaning into the engine compartment of the vehicle. The height of the frame attachment to the vehicle bumper is adjustable as is also the height of the step on the frame assembly. Further, the attachment assembly which holds the frame to the vehicle wheel can be adjusted to fit any common wheel size.

5 Claims, 2 Drawing Sheets

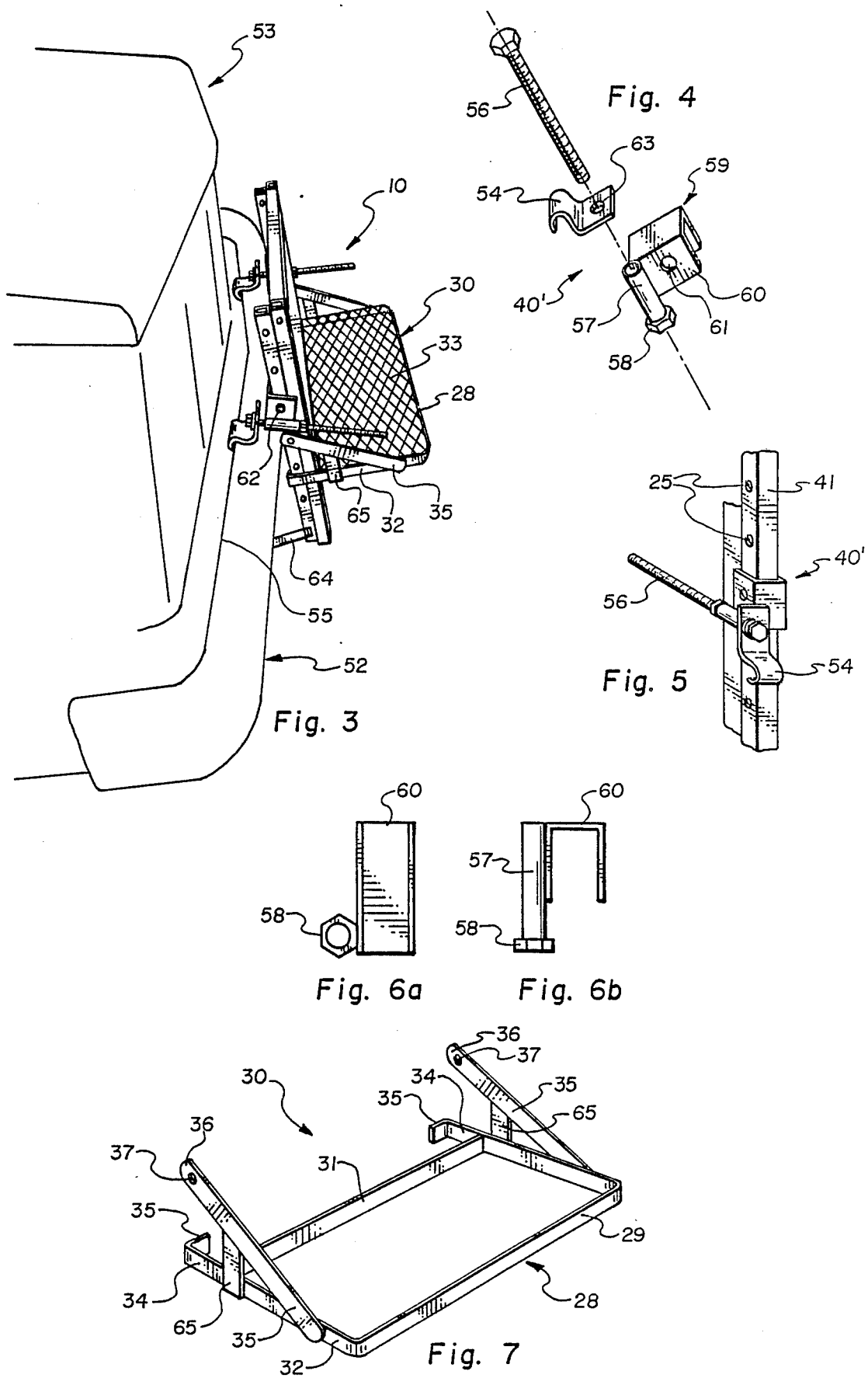

STEP FOR ATTACHMENT TO A WHEEL OR BUMPER

BACKGROUND OF THE INVENTION

The present invention relates generally to a step or platform. More particularly, the invention relates to a portable step or platform which can be attached to a wheel or bumper of a vehicle to support a person.

Large vehicles such as trucks, tractors, semi-tractors, four-wheel drive vehicles, etc. tend to be extremely high off the ground making it difficult to access the engine compartment when necessary. An average size person must either stand on the vehicle bumper, a ladder, bench, box or similar object in order to access the engine compartment. Alternatively, the person must lay his body over the grill or quarter panel to support himself while reaching into the engine compartment. Each of these methods of accessing the engine compartment are generally impractical. Supports such as a ladder, box or bench are often not available and tend to be awkward and unreliable for support. For example, a box, bench or ladder has the tendency to overturn under the outward thrust of the person's feet when he is reaching far into the engine compartment.

Standing on the vehicle bumper tends to be less than satisfactory also in that the bumper is generally not of a sufficient width to allow for secure placement of the person's feet, nor of an adjustable height to allow for the most convenient access to the engine compartment by the user.

Attempts have been made to provide a vehicle-attached support platform which overcomes the above problems. These previous attempts have met with only limited success. For example, Hays, U.S. Pat. No. 4,782,916 discloses a wheel-attached step support. The step is vertically adjustable on a set of side supports. A pair of hooks rests over the vehicle wheel and is held in place by a pair of adjustable plates. The plates being adjustable threaded bars which screw into and out of the hook members. Hays also shows a bumper attachable embodiment of his step device in which the hooks are modified to allow them to attach over an upper edge of the bumper.

Anderson, U.S. Pat. No. 2,378,678 shows another wheel-attached step support having hooks which attach over a wheel and a support frame which holds a step thereto.

Kelling, U.S. Pat. No. 3,078,952 also shows a vehicle wheel step. Kelling's device comprises hooks which can be adjusted to fit over a vehicle wheel and which hold a frame to which is attached an adjustable step.

Although each of these prior art devices includes portable steps and platforms which can be attached to a vehicle wheel or bumper, they have not completely solved the problems inherent in portable platforms of this type. The present invention specifically provides a secure and stable platform which remains in place even when being subjected to outward or sideways pressure by the user's feet when he is reaching into the engine compartment. Finally, the present invention is simple and compact in design and universally adaptable for use on a wide variety of shapes and sizes of vehicle wheels and bumpers. Further, the prior art devices have not completely successfully combined simplicity in design with structural strength and integrity, in the manner as has been achieved by the present invention, along with ease and convenience of adjustability for use on a wide variety of vehicles.

SUMMARY OF THE INVENTION

An object of the present invention is to provide a step or platform for supporting a person.

A further object of the invention is to provide a step or platform which is attachable to the wheel or bumper of a vehicle which will not move or become otherwise unstable due to lateral forces on the platform caused by a user.

Another object of the present invention is to provide a step or platform which is portable, and easily adjustable for use on a wide variety of vehicles, yet which is also of a sturdy construction and design, thus rendering it safe and reliable in use.

These and other objects of the present invention are realized in a specific illustrative embodiment of the step or platform which comprises a supporting frame of generally rectangular shape having top and bottom supporting frame members, and two side supporting frame members, the side supporting frame members each having attached thereto an elongate step adjustment bar, a tire hooking member attachable by means of L-shaped attachment members to the support frame, which is adjustable to conform to the width of a vehicle wheel and which rests over and secures to the rear surface of the vehicle wheel for suspending the support frame adjacent the front surface of the vehicle wheel, a step or platform including a frame covered with an open wire mesh having a pair of hook members extending from the rear surface thereof, and bracing members which extend from each of the side surfaces thereof, the bracing members being attachable to the step adjustment bar on the support frame at a plurality of locations to adjust the level of the platform, and the hooks and rear surface of the step frame being securable around the support frame and adjustment bar respectively in a slidable relationship therewith.

A second embodiment of the present invention employs a pair of bumper hooks which attach to the vehicle bumper in lieu of the tire hook members as mentioned above, the bumper hooks being attachable to the support frame by means of a bumper hook attachment member which is adjustably mountable on the step adjustment bar.

BRIEF DESCRIPTION OF THE DRAWINGS

The above and other objects, features and advantages of the invention will become apparent from a consideration of the following detailed description presented in conjunction with the accompanying drawings wherein like numerals refer to like parts throughout, and in which:

FIG. 3 is a perspective view of the portable step embodying the principles of the present invention attached to a vehicle bumper;

FIG. 4 is, an expanded perspective view of the bumper attachment assembly of the invention;

FIG. 5 is a perspective view of the bumper attachment assembly present invention attached to the support frame;

FIG. 6a is a side view of the bumper hook attachment member of the present invention;

FIG. 6b is a top view of the bumper hook attachment member of FIG. 6a; and

FIG. 7 is a perspective view of the step assembly of the present invention with the grating removed therefrom.

DETAILED DESCRIPTION OF THE INVENTION

Figure 1:
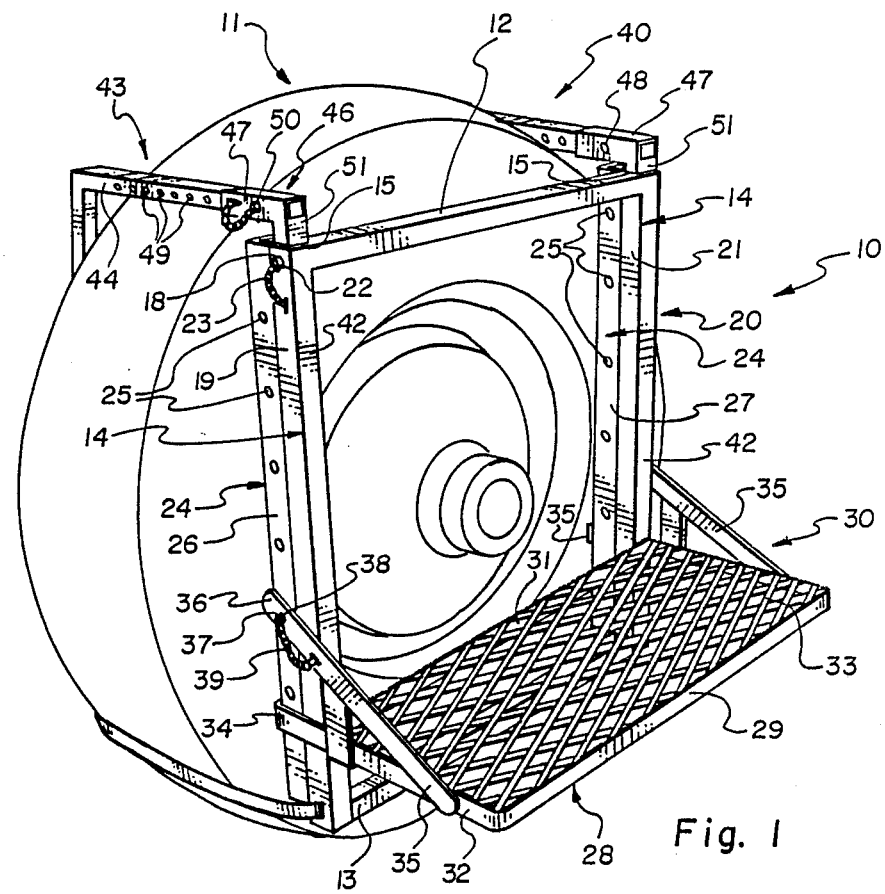
FIG. 1 is a perspective view of the portable step embodying the principles of the present invention attached to a wheel of a vehicle.
Figure 2:
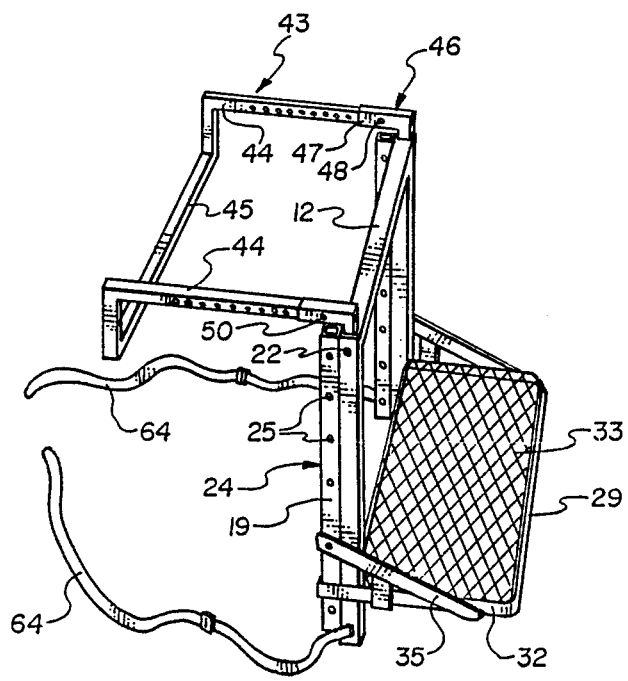
FIG. 2 is a perspective view of the portable step embodying the principles of the present invention for use on a vehicle wheel.

Referring to FIG. 1 of the present invention, the portable step 10 as configured for use on a vehicle wheel 11 is comprised of three basic assemblies, a supporting frame assembly 20, a step assembly 30 and a wheel attachment assembly 40.

The supporting frame assembly 20 includes a generally rectangular shaped supporting frame made preferably of tubular steel having a generally rectangular cross section and comprises a top brace member 12, a bottom brace member 13, and a pair of side supporting frame members 14.

The brace members 12 and 13 are attached to the side supporting frame members 14 as by welding or the like, and are located such that the tubular ends 15 of the side supporting frame members 14 remain open. The open ends 15 of the side supporting frame members 14 which are located adjacent the top of the frame assembly 20 allow for insertion of a portion of the wheel attachment assembly 40 therein in the manner as will be explained below.

Each of the side supporting frame members 14 further including an opening 18 near the top thereof which extends from an exterior side surface 19, through the interior of the frame member 14 to an interior side surface 21. A pin 22 may be inserted into the opening 18 in order to secure the wheel attachment assembly 40 to the supporting frame assembly 20. The pin 22 may advantageously be secured to the supporting frame assembly by means of a chain 23 or the like, which is attached to the head of the pin 22 and to the supporting frame assembly 20.

Although a chain 23 is shown as the preferred method of attaching the pin 22 to the frame assembly 20, any other similar means may be provided to insure that the pin 22 remains attached to the frame assembly 20, even when removed from the opening 18. Also, although the chain 23 is shown to be attached to the exterior side surface 19 of the side supporting frame member 14, it may of course be attached at any convenient location. Also, the pin 22 may be of any well-known design including the lockable type which may be locked in its position in the opening in a well-known manner.

The supporting frame assembly 20 further includes a pair of elongate step adjustment bars 24, preferably made of the same tubular material as the side supporting frame members 14, which are securely attached to the rear surfaces of the side supporting frame members 14 such as by welding or the like. The step adjustment bars 24 having a plurality of openings 25 formed in their interior and exterior side surfaces 26 and 27 at regularly spaced-apart locations along their entire length. The openings 25 are used to allow the step assembly 30 to be secured to the supporting frame assembly 20 at various locations along the entire length of the side supporting frame members 14 in the manner as will be explained below.

The step assembly 30, as best seen in FIGS. 1 and 7, comprises a generally rectangular step frame 28 which includes a front and rear framing member (29 and 31) and a pair of side framing members 32. The front 29 and sides 32 of the frame 28 are preferably formed of a U-shaped solid metal band of generally rectangular cross section to which is welded the rear framing member 31 made preferably of the same type material. A platform 33, preferably formed of expanded metal mesh, is welded or otherwise securely attached to the step frame 28.

Each of the side framing members 32 extend beyond their connection with the rear framing member 31 a distance approximately equal to the combined width of the side supporting frame member 14 and step adjustment bar 24. The ends of the side framing members 32 forming L-shaped hooks 34. The base 35 of each L-shaped hook being directed inwardly toward each other in a direction parallel to the rear step frame member 31.

The step assembly 30 further includes a pair of bracing bars 35 securely attached to the outside surface of each of the side framing members 32 as by welding, bolting or the like, and extend rearwardly and upwardly at an angle of approximately 30 degrees from horizontal. The bars 35 may each attach to a side framing member 32 at a single point, or may include an appendage 65 which is welded or bolted to the bars 35 and the side framing member 32.

The bracing bars 35 are formed to a length necessary to allow the free ends 36 thereof to be located directly adjacent the exterior side surfaces 26 of the step adjustment bars 24 when in place on the support frame assembly 20. An opening 37 is located in the free end 36 of each of the bracing bars 35 so as to coincide with the openings 25 in the step adjustment bars 24. A pin 38 may be securely attached to the bracing bars 35 such as by means of a chain 39. The pin 38 can be placed through the bracing bar opening 37 and into an opening 25 in the adjustment bar 24 in order to fix the step assembly 30 into the desired predetermined location on the frame assembly 20.

When the step assembly 30 is attached to the supporting frame assembly 20, the base 35 of each of the step hook members 34 rests adjacent the rear surface 41 of each of the step adjustment bars 24. Also, the back framing member 31 of the step frame 28 rests adjacent the front surface 42 of each of the side supporting frame members 14. The step hooks 34, in conjunction with the back framing member 31 form a U-shaped channel which can slide in a vertical direction along the adjustment bar 28 and side supporting frame members 14 of the supporting frame assembly 20.

To fix the step assembly 20 in a desired location, the step assembly 20 is slid along the supporting frame assembly 20 until the opening 37 in the bracing bars 35 matches with an opening 25 in the step adjustment bars 24. The pins 38 are then inserted through the bracing bar openings 37 and the step adjustment bar openings 25 to secure the step assembly 20 from further sliding movement.

When the step assembly 30 is thus attached to the supporting frame assembly 20, a load on the platform 33, such as a person standing thereon, is fully supported by the bracing bars 35 and the contact between the rear framing 31 member and the front surface 42 of the side supporting frame members 14. The step assembly 20 is prevented from being moved in a lateral direction relative to the supporting frame assembly 20 by the upper portions of the L-shaped step hooks 34 which rest adjacent the exterior side surfaces 19 and 26 of the side supporting frame members 14 and the adjustment bars 24 respectively. The step assembly 30 is also prevented from being moved outwardly away from the supporting frame assembly 20 by the base portions 35 of the L-shaped step hooks 34 which rest adjacent the rear surface 41 of the adjustment bars 24.

The third major component of the invention is the wheel attachment assembly 40. The wheel attachment assembly 40 functions to hold the supporting frame assembly 20 in position adjacent the exterior side of the wheel 11 and includes an attachment bar 43 having a pair of adjustment members 44 which are held in spaced-apart parallel relationship by an elongated generally U-shaped gripping member 45. The adjustment members 44 are slidable through the interior of a pair of attachment members 46 in a manner as will be explained.

The attachment members 46 may be formed in an L-shape having a first leg 47 thereof which is hollow and sized to allow an adjustment member 44 to pass therethrough. An opening 48 may be located through the exterior side surface thereof, which opening 48 may be matched with openings 49 along the side surfaces of the adjustment members 44, such that a pin 50 may be inserted therethrough to fix the relative position of the adjustment member 44 and the attachment member 46 as in the manner described previously with respect to the other pins used in the invention.

The second leg 51 of the L-shaped attachment members 46 is sized to allow it to be slid into the top end opening 15 of the side supporting frame members 14. An opening (not shown) in the side surface thereof corresponding to the opening 18 in the exterior side surface 19 of the side supporting frame members 14 may be pinned in the same manner as indicated above with respect to the other pinned connections of the invention. If desired, however, legs 51 may alternatively be welded or otherwise permanently attached to the side supporting frame members 14.

The adjustment members 44 have a plurality of openings 49 to allow for the correct spacing between the gripping member 45 and the supporting frame assembly 20 for the particular width of wheel 11 to which it is to be attached. The openings 49, therefore, correspond to distances at which the gripping member 45 must be separated from the supporting frame assembly 20 in order for the invention to accommodate various standard tire widths.

Although the attachment members 46 are shown to be L-shaped, it is also contemplated and considered to be within the scope of the present invention to form them in a generally T-shaped configuration In such configuration, the first leg 47 as shown, would extend beyond the point of attachment with the second leg 51. This configuration would allow greater stability at the connection between the adjustment member 44 and the attachment member 46.

In a second embodiment of the invention, the wheel attachment assembly 40 is removed entirely from the portable step 10, and a bumper attachment assembly 40' is attached. As best seen in FIG. 3, the embodiment of the invention employing the bumper attached assembly 40' allows the portable step 10 to be attached at any location along the entire length of either the front or rear bumper 52 of a vehicle 53.

The bumper attachment assembly includes a bumper hook 54 which attaches around the upper edge 55 of a bumper 52 and is held to the supporting frame assembly 20 by means of a bolt 56 which is secured through a bolt channel 57 into a nut 58 located on the bumper hook attachment member 59.

The bumper hook attachment member 59 includes a U-shaped member 60 which is attachable to the step adjustment bar 24 in the manner as is best seen in FIGS. 3 and 5. The U-shaped member 60 has formed therein an opening 61 which will match with the openings 25 located in the step adjustment bar 24 when the channel of the U-shaped member 60 is slid in place therearound. When properly in place on the supporting frame assembly 20, each U-shaped member 60 is adjacent to and in contact with the rear and side surfaces 41 and 26 and 27 respectively of each adjustment bar 24. A pin 62 or the like is then placed through the opening 61 in the U-shaped member 60 and the opening 25 in the step adjustment bar 24 to secure the bumper hook attachment member 59 to the supporting frame assembly 20.

As best seen in FIGS. 6a and 6b, the U-shaped member 60 has attached thereto as by welding or the like, an elongate tubular bolt channel 57. The bolt channel 57 acts to hold the bumper hook 54 in its correct location and orientation relative to a vehicle bumper 52 when in place thereon. A nut 58 is attached to the opposite end of the bolt channel, also as by welding or the like.

As is best seen in FIG. 5, when the bumper attachment assembly 40' is attached to the step adjustment bar 24, the bolt 56 passes through the opening 63 in the bumper hook 54 and through the bolt channel 57 and threads into the nut 58.

When the step is placed on a vehicle bumper 52, the bumper hooks 54 are attached to the upper edge 55 thereof and are held to the frame assembly 20 by means of the bumper hook attachment members 59. The distance the bolt 56 is screwed through the nut 58 can be adjusted to allow for correct positioning and leveling of the platform 33 of the step assembly 30.

The bumper hook attachment members 59 can be pinned into any unused opening 25 in the step adjustment bars 24 so that the supporting frame assembly 20 can be attached at any predetermined elevation desired relative to the vehicle 53.

The portable step 10 of the present invention also contemplates the use of stabilizing straps 64 which may be attached at the bottom of each of the side supporting frame members 14 and which can extend around each side of the bottom of the vehicle wheel 11, or beneath the vehicle bumper as the case may be, and be secured to the vehicle axle or frame or other portion of the vehicle (not shown) to increase the stability of the portable step 10. The stabilizing straps 64 may be any common type of strap, rope or cord, either elastic or non-elastic, which can be tightly attached to the vehicle 53 to more securely prevent movement of the portable step 10 caused by lateral forces applied at the platform 33.

It is to be understood that the above-described embodiments are only illustrative of the application of the principles of the present invention. Numerous modifications or alternative arrangements or embodiments may be devised by those skilled in the art without departing from the spirit and scope of the present invention. For example, the platform 33 may alternatively be formed of a solid piece of material instead of a mesh, or may be formed of a material having any different pattern of openings and may also comprise gripping surfaces.

Further, the portable step 10 of the present invention may be made of any material of sufficient strength such as metal, wood or plastic.

Also, each of the pin members described herein may be any well-known type of locking or non-locking pin. Further, each of the pins may be permanently attached to the portion of the assembly on which it is to be used by means of a chain which is welded to the pin and welded to the assembly.

Further, the framing members may be formed of any material of suitable strength such as metal, wood or plastic and may be formed of solid material where possible or of hollow tubing, and may have either a rectangular cross-section as shown, or any other cross-sectional shape such as circular, etc.

I claim:

1. A portable step apparatus for removable connection to a vehicle for providing a stable platform for supporting a person while working on said vehicle, the apparatus comprising:

a support frame assembly means having a pair of side supporting frame members held in a spaced-apart relationship by frame bracing means, and at least one step adjustment means rigidly attached to at least one of said side supporting frame members, step assembly means having a step frame having a back surface, a first and second side surface and a top surface, at least one of said side surfaces including a hook member, and at least one bracing member extending from at least one of said side surfaces, means for attaching said step bracing means to said step adjustment means to prevent relative movement therebetween, and means for attaching the support frame assembly means to a vehicle, whereby, said step assembly means can be slidably attached to said side supporting frame members and said step adjustment means such that said at least one hook member and said back surface of said step frame form a U-shaped channel which can attach to said at least one step adjustment member and at least one of said side supporting frame members in slidable relationship, and whereby said means for attaching said step bracing to said step adjustment means allows said step assembly means to be fixed to said support frame assembly means at a plurality of predetermined locations to prevent relative movement therebetween.

2. A portable step or apparatus according to Claim 1 wherein said means for attaching the support frame assembly means to a vehicle includes a U-shaped gripping member having a first end and a second end, a pair of adjustment members, one of each of said adjustment members being attached to each end of said U-shaped gripping member, and a pair of attachment members, each attachment member being attachable to said support frame assembly means, and also being attachable to said adjustment members at a plurality of predetermined locations.

3. A portable step apparatus according to Claim 1 wherein said means for attaching the support frame assembly means to a vehicle includes a pair of hooking means adjustably attachable to said step adjustment means, and capable of being attached to a bumper of a vehicle.

4. A portable step apparatus according to Claim 2 wherein said means for attaching the support frame assembly means to a vehicle further includes elongate stabilizing members if attached to said support frame assembly means.

5. A portable step apparatus according to Claim 3 wherein said means for attaching the support frame assembly means to a vehicle further includes elongate stabilizing members if attached to said support frame assembly means.

* * * * *